(12) United States Patent
Jalayer

(10) Patent No.: US 6,543,463 B1
(45) Date of Patent: Apr. 8, 2003

(54) DEVICE FOR CLEANING AIR LINES

(76) Inventor: Behrooz Jalayer, 7008 Breakwater Pl., Prospect, KY (US) 40059

( * ) Notice: Subject to any disclaimer, the term of this patent is extended or adjusted under 35 U.S.C. 154(b) by 0 days.

(21) Appl. No.: 09/878,826

(22) Filed: Jun. 11, 2001

Related U.S. Application Data

(60) Provisional application No. 60/215,609, filed on Jun. 30, 2000.

(51) Int. Cl.[7] .............................. G01C 21/10; B08B 9/00
(52) U.S. Cl. .............................. 134/169 R; 134/169 C; 73/182; 73/861.65
(58) Field of Search .............................. 73/182, 861.65, 73/861.66, 861.67, 861.68; 134/113, 169 R, 169 C

(56) References Cited

U.S. PATENT DOCUMENTS

| | | | |
|---|---|---|---|
| 382,362 A | 5/1888 | Hogg | 73/182 |
| 2,362,298 A | 11/1944 | Newell | 73/182 |
| 3,327,530 A | 6/1967 | Lepird | 73/182 |
| 3,349,615 A | * 10/1967 | Finkl | 73/182 |
| 3,380,298 A | 4/1968 | Hanson | 73/182 |
| 4,174,049 A | 11/1979 | Bolen | 222/5 |
| 4,498,347 A | * 2/1985 | Grantham et al. | 73/861.66 |
| 4,501,288 A | 2/1985 | Field | 137/240 |
| 4,611,488 A | * 9/1986 | Weingart | 73/182 |

* cited by examiner

*Primary Examiner*—Randy Gulakowski
*Assistant Examiner*—Joseph Perrin
(74) *Attorney, Agent, or Firm*—Charles G. Lamb; Middleton Reutlinger

(57) ABSTRACT

A pneumatic pressure line cleaning assembly for clearing the pneumatic lines of a pressure gauge, specifically a speedometer for a power boat, is attached to a cut tube of the pneumatic line between the pressure gauge and the air intake opening with a second port of a three-port valve being connected in flow communication with the pressure gauge and a third port opening of the three-port valve being in flow communication with the pressure intake opening. The first port of the three-port valve is in flow communication with an air compressor. In normal operating conditions, ports two and three of the three-port valve are in flow communication so that the pressure gauge pneumatic line is in flow communication with the pressure intake opening and in a second position, the three-port valve is positioned so that the third-port is in flow communication with the first port. In the second position, the air compressor is actuated to provide pressurized bursts of air in a direction towards the air intake opening.

2 Claims, 1 Drawing Sheet

DEVICE FOR CLEANING AIR LINES

CROSS REFERENCE TO RELATED APPLICATIONS

This is a utility patent application claiming priority of Provisional Patent Application No. 60/215,609 filed Jun. 30, 2000.

BACKGROUND OF THE INVENTION

This invention relates to a device for unclogging air or pressure lines and more particularly to a device for unclogging the pneumatic pressure lines between a speedometer and its intake in the housing of a boat motor.

In the use of pneumatic pressure for the operation of many types of devices, such as pressure gauges for speedometers used a in power boats, or the like, the pneumatic pressure intake lines are exposed to an environment which contains particulate materials therein. And, it is common for the intake into the pneumatic pressure lines to become clogged. In many applications these intake openings, or ports, are difficult to get to in order to clean or remove the particulate materials plugging the opening. Particularly, in the operation pressure activated speedometers for a power boat, the pneumatic pressure speedometer is in flow communication via a flexible tubing with the intake, the intake into the pneumatic air line being disposed in a direction counter to the flow of water which creates the pressure within the pneumatic line. In rivers, lakes, and the like, it is common for the water to have floating particulate materials therein to clog the pneumatic pressure intakes and lines and therefore prevent operation of the speedometer. In many instances, when the pneumatic pressure line intake is in an outboard motor housing, it requires removing the boat from the water to unclog the line, which is relatively time consuming and costly.

SUMMARY OF THE INVENTION

It is an object of the present invention to provide a device for unclogging air lines.

It is another object of the present invention to provide a device for unclogging pneumatic pressure lines and intakes for the speedometer for power boats.

More particularly, the present invention is directed to a device which includes a pressurized air source in flow communication with a three-port valve wherein two of the ports in the valve are connectable to the tubes connecting a fluid intake opening and a pressure gauge. One port in the valve is connectable to a tube which connects to the pressure gauge and another port is connectable to a tube in flow communication with the intake opening into a pneumatic line. The third port is in flow communication with a pressurized air source. Thus, when the pressurized air source is activated, the position of the valve is positioned so that the air flows through the three-port valve in the direction of the intake opening and when the pressurized air source is in an off or deactivated condition, the three-port valve is positioned so that the intake opening is in flow communication with the pressure gauge (speedometer).

DETAILED DESCRIPTION OF THE PREFERRED EMBODIMENT

Figure 3:
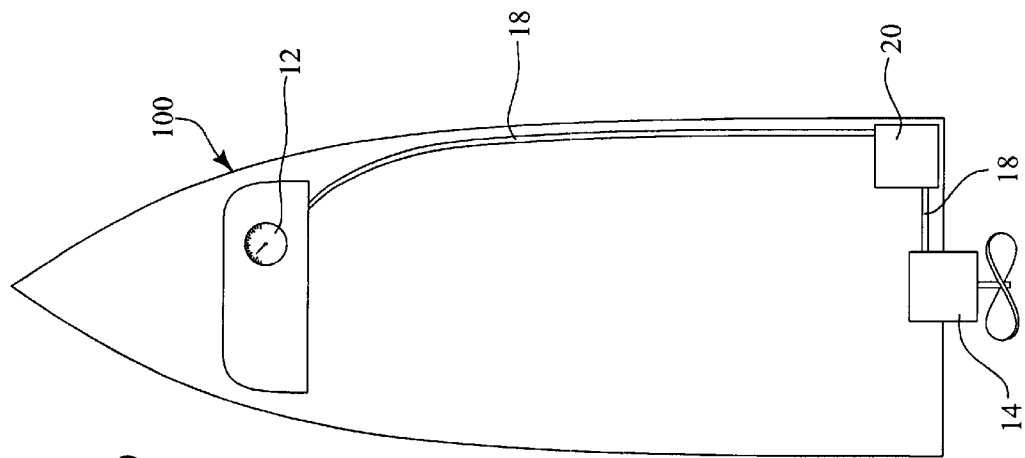
Figure 1:
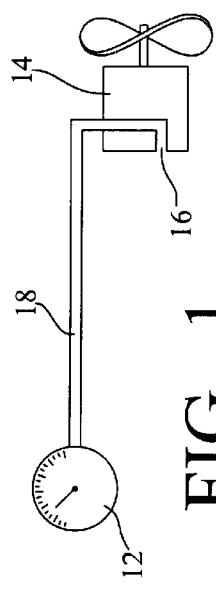
FIG. 1 is an enlarged schematic of a prior art example utilizing a pneumatic pressure device.

As shown in FIGS. 1 and 3, a pressure activated speedometer 12 for a power boat 100, or the like, is in flow communication through a tubing 18 with an intake opening 16 into an outboard motor housing 14. In operation, as a power boat 100 moves through the water increasing or decreasing the speed of the boat motor 14 increases or decreases the pressure of the water at the intake opening 16 thereby compressing or depressing the air within the tubing 18. Thus, the increasing or decreasing pressure to the speedometer 12 creates a scale reading that approximates the speed of the boat.

Figure 2:
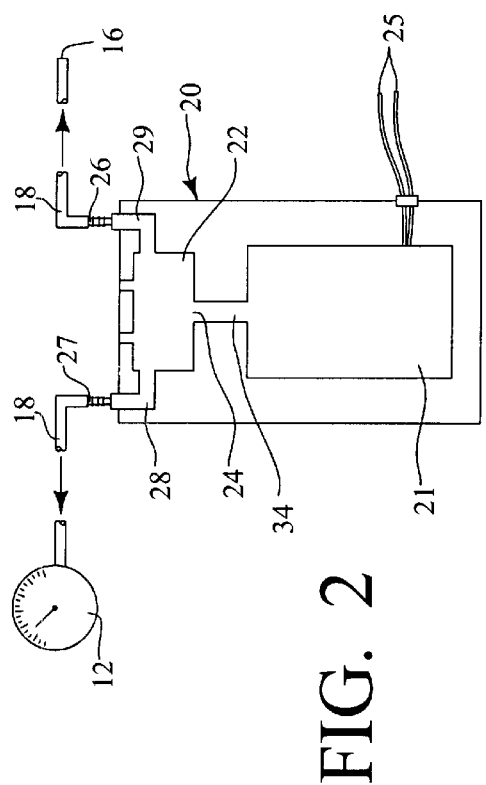
FIG. 2 is an enlarged schematic showing a diagram of the present invention; and, FIG. 3 is a schematic of a power boat illustrating a preferred installation of the present invention.

In the schematic drawing, as shown in FIG. 2, the tubing 18 has been cut at an intermediate point between the pressure gauge 12 and the intake opening 16 and connected to a three-port valve 22 in a pneumatic pressure line cleaning assembly, identified by the numeral 20. The line cleaning assembly 20 is shown as including an air compressor 21, which may be a 12-volt piston air compressor, capable of producing up to 200 psi (or more as required) of compressed air. The valve 22 is a 12-volt solenoid actuated three-port valve, which is well known in the art. A first port 24 of the valve 22 is in flow communication with a tube 34 which is on the downstream side of the air compressor 21. A second port 28 of the valve 22 is in flow communication through a line 27 to one end of the cut tubing 18 which is connected to the gauge 12. Thus, the port 28 is in flow-through communication with gauge 12. The third port, identified by the numeral 29, is in flow communication with the intake opening 16 in the outboard motor housing 14 through the flow-through connecting tube 26 which connects the port 29 with the flow-through tubing 18. The 12-volt air compressor 21 is powered by a 12-volt battery, as illustrated by the electrical lines 25, which is in turn in electrical communication with the three-port valve 22 and the switch 23 which may be a spring action automatic on/off switch. Thus, the line cleaning assembly 20 is installed so that the three-port valve 22 provides flow through communication between intake 16 and the gauge or speedometer or other type of measuring device 12 in one position, and supplies pressurized air from air compressor 21 to the intake 16 in a second position.

To operate the line cleaning assembly 20, the spring switch 23 is pushed to an on or activated position and simultaneously the air compressor 21 is activated while the three-port valve 22 shuts off the passageway 28 to the gauge 12. With successive bursts of compressed air going through the passage 29, line 18 to intake 16, line 18 is pressurized and thereby clears the intake 16. Releasing the spring switch 23 or turning switch 23 to an off position, returns the valve 22 to its normal operation position which allows for the pneumatic air to pass through the line 29 from the intake 16 and then out through passage 28 to the gauge or measuring device 12. This process of operation may be repeated a number of times until the gauge indicates clear and unhindered passage of air or pressure.

It is realized that a speedometer for power boats is exemplified, but it is realized that other uses for unclogging pneumatic lines, such as, for example air horns, may also be used with the present invention.

What is claimed is:

1. A pneumatic pressure line cleaning assembly and pressure gauge comprising:

a three-port valve having a first port, a second port, and a third port;

a compressor connected to one end of a first tube and said first port being connected to an opposed end of said first tube to provide unobstructed flow communication between said compressor and said first port;

said second port being connected to a line in unobstructed flow communication with a pneumatic pressure gauge;

said third port being adaptable for connection to a line in flow communication with a fluid intake opening;

said three-port valve being rotatable between a first position wherein said second port and said third port are in flow communication and a second position wherein said first port is in flow communication with said third port; and, said three-port valve being a solenoid actuated valve, said first position being in a deactivated condition and said second position being in a solenoid activating position.

2. The cleaning assembly of claim 1, said pressure gauge being a speedometer for a power boat and said fluid intake opening into a body of water in which a boat will be operable.

* * * * *